United States Patent
Burke

[11] 3,882,019
[45] May 6, 1974

[54] PROCESS FOR EFFLUENT WATER RECOVERY

[75] Inventor: Zane L. Burke, Whittier, Calif.

[73] Assignee: Hill Brothers Chemical Co., Inc., City of Industry, Calif.

[22] Filed: Jan. 2, 1974

[21] Appl. No.: 430,060

[52] U.S. Cl. .................. 210/45; 210/47; 210/49; 210/53
[51] Int. Cl. ............................................. C02b 1/20
[58] Field of Search ............ 210/45, 47, 48, 49, 67, 210/68, 42; 423/92, 93, 95, 98, 531, 545, 548, 549, 559, 566, 434; 136/27, 165; 75/103

[56] References Cited
UNITED STATES PATENTS

| | | | |
|---|---|---|---|
| 1,738,081 | 12/1929 | Smith | 423/434 |
| 2,104,076 | 1/1938 | Frick et al. | 423/95 |
| 3,620,670 | 11/1971 | Bratt et al. | 423/95 |

Primary Examiner—Thomas G. Wyse
Assistant Examiner—Benoit Castel
Attorney, Agent, or Firm—Philip M. Hinderstein

[57] ABSTRACT

A process for converting effluent water which has been contaminated with lead and sulfuric acid as a result of a manufacturing process into water suitable for reuse in such manufacturing process comprising the steps of adding lead carbonate to the effluent water in a first agitated enclosure thereby forming water, carbon dioxide, and insoluble lead sulfate, filtering the water from the lead sulfate, and conducting the filtered water back to the manufacturing process for reuse. The filtered lead sulfate is added to a solution of ammonia, ammonium sulfate, carbon dioxide, and water in a second agitated enclosure to form ammonium sulfate and lead carbonate. The ammonium sulfate liquid is filtered from the lead carbonate and conducted to a holding tank for reuse in the second agitated enclosure. The filtered lead carbonate is dried to remove residual ammonia therefrom whereupon the dried lead carbonate powder may be conducted back to the first agitated enclosure for reuse. The carbon dioxide from the first agitated enclosure and the liberated ammonia from the dryer may be conducted back to the ammonium sulfate holding tank. Finally, excess ammonium sulfate from the holding tank may be conducted to a crystallizer for generation of ammonium sulfate crystals.

15 Claims, 1 Drawing Figure

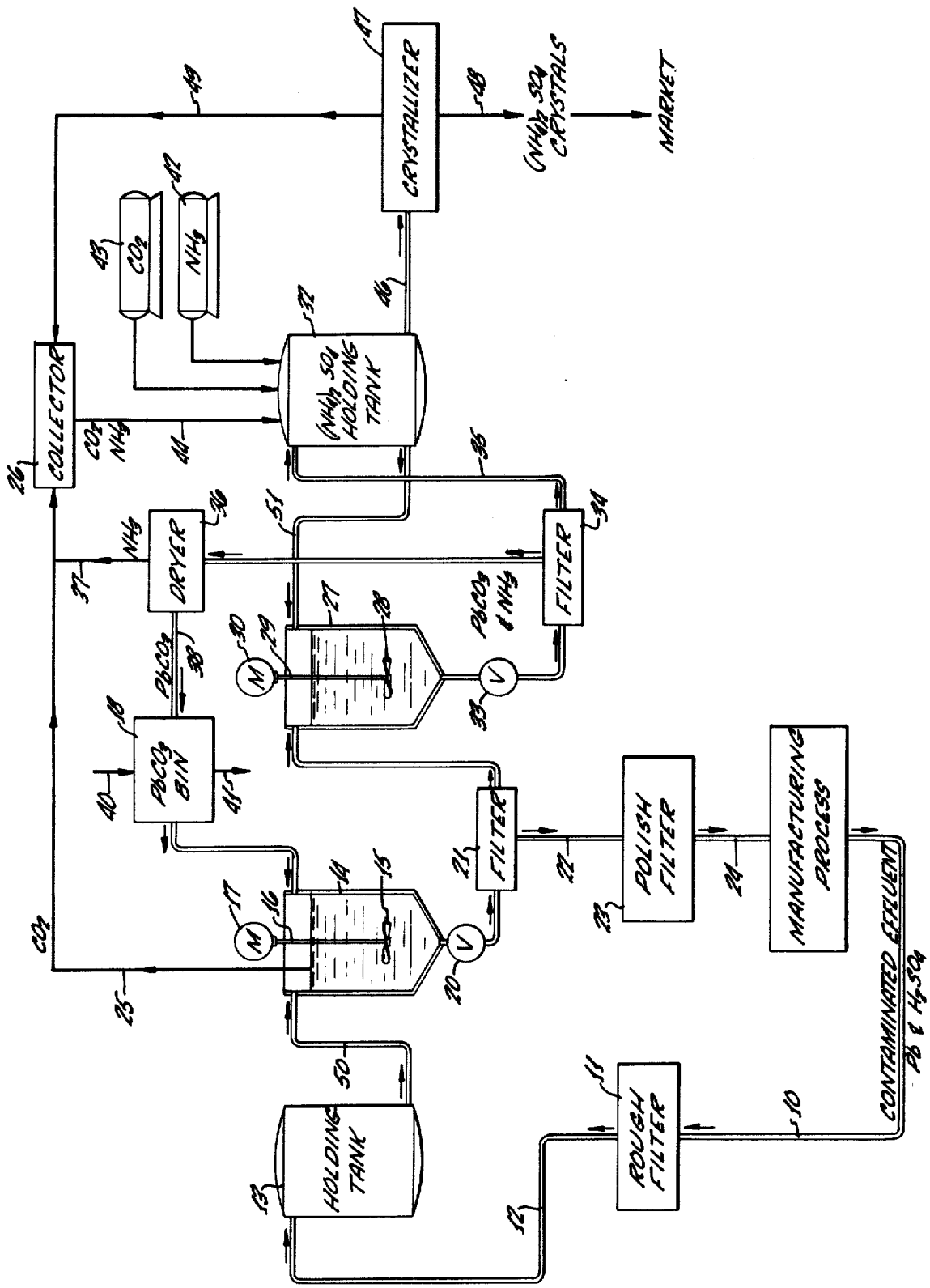

PROCESS FOR EFFLUENT WATER RECOVERY

BACKGROUND OF THE INVENTION

1. Field of the Invention

The present invention relates to a process for effluent water recovery and, more particularly, to a process for stripping lead and sulfuric acid from effluent water to a level allowing the water to be recirculated as process water and for converting the lead and sulfuric acid to a safe and reusable form.

2. Description of the Prior Art

In the manufacture of wet cell batteries, large amounts of process water are used to wash the battery plates. Such manufacturing process water becomes contaminated with relatively small quantities of sulfuric acid and lead; in some cases as high as 25,000 p.p.m. sulfuric acid and 30 p.p.m. lead. Once used and thus contaminated, the effluent water cannot be used again since the sulfuric acid therein would disturb the manufacturing process.

Heretofore, the contaminated process water has been treated with ammonia to neutralize the acid and filtered to remove the precipitated lead. Even though neutralized, the effluent water still contains sulfuric acid and now ammonia and cannot be reused in the manufacturing process. Thus, it has been common practice to dispose of the effluent water by conducting it into a sewer.

The effluent water is still very high in total dissolved solids, plus containing lead at a density of as much as five p.p.m. Although the disposal of this effluent has been permissible in the past, it is rapidly becoming non-permissible from an ecological standpoint.

SUMMARY OF THE INVENTION

In accordance with the present invention, there is provided a novel process for effluent water recovery which completely eliminates the necessity for disposing of the effluent process water. With the present process, the effluent water, which has been contaminated with lead and sulfuric acid, is processed in such a manner that the lead and sulfuric acid is stripped from the water to a level allowing it to be recirculated as process water. Furthermore, the lead and sulfuric acid are converted to a safe form which may be easily reused or disposed of.

Briefly, the present process for converting effluent water which has been contaminated with lead and sulfuric acid as a result of a manufacturing process into water sutiable for reuse in such manufacturing process comprises the steps of adding lead carbonate to the effluent water in a first agitated enclosure thereby forming water, carbon dioxide, and insoluble lead sulfate, filtering the water from the lead sulfate, and conducting the filtered water back to the manufacturing process for reuse. The filtered lead sulfate is added to a solution of ammonia, ammonium sulfate, carbon dioxide, and water in a second agitated enclosure to form ammonium sulfate and lead carbonate. The ammonium sulfate liquid is filtered from the lead carbonate and conducted to a holding tank for reuse in the second agitated enclosure. The filtered lead carbonate is dried to remove residual ammonia therefrom whereupon the dried lead carbonate powder may be conducted back to the first agitated enclosure for reuse. The carbon dioxide from the first agitated enclosure and the liberated ammonia from the dryer may be conducted back to the ammonium sulfate holding tank. Finally, excess ammonium sulfate from the holding tank may be conducted to a crystalizer for generation of ammonium sulfate crystals.

It is therefore an object of the present invention to provide a process for effluent water recovery.

It is a further object of the present invention to provide a process for stripping lead and sulfuric acid from effluent water to a level allowing the water to be recirculated as process water and for converting the lead and sulfuric acid to a safe and reusable form.

It is a still further object of the present invention to provide a process for effluent water recovery which is relatively straight forward and constructed from standard, readily available components.

It is another object of the present invention to provide a process for effluent water recovery in which the contaminants are converted to a usable form having economic value.

It is still another object of the present invention to provide a process whereby literally thousands of tons of polluted water per day are kept out of the environment.

Still other objects, features, and attendant advantages of the present invention will become apparent to those skilled in the art from a reading of the following detailed description of the preferred embodiment constructed in accordance therewith, taken in conjunction with the accompanying drawings wherein:

BRIEF DESCRIPTION OF THE DRAWINGS

The sole FIGURE is a flow diagram, in block form, of the present process for effluent water recovery.

DESCRIPTION OF THE PREFERRED EMBODIMENT

Referring now to the drawings, the manufacture of wet cell batteries requires large amounts of process water that becomes contaminated with lead, Pb, and sulfuric acid, $H_2SO_4$, in varying quantities. The contaminated process water from the manufacturing process, appearing in a conduit 10 and containing Pb in various forms and $H_2SO_4$, is conducted to a rough filter 11. Filter 11 is a conventional filter for removing the larger undissolved solids in the effluent water, such as a good deal of the free lead and miscellaneous other contaminants. The output of rough filter 11, in a conduit 12, therefore contains sulfuric acid and lead.

The effluent water in conduit 12 is conducted to a holding tank 13 for accumulation. Since the present process is a batch process, tank 13 permits the effluent water to accumulate while the previous batch of water is being processed. At an appropriate time, the output of holding tank 13 is conducted to a first reaction vessel 14. Vessel 14 may simply be a large tank, the contents of which are adapted to be agitated by a blade 15 connected by a shaft 16 to a drive motor 17. After tank 14 is filled with the effluent water from holding tank 13, fine, powdered lead carbonate, $PbCO_3$, is added from a bin 18 and the mixture is agitated.

Lead carbonate is soluble in sulfuric acid and is converted to lead sulfate which precipitates out as an insoluble sulfate, thus stripping the sulfate molecules from the water molecules. Another product of the reaction is carbon dioxide. The complete reaction is represented by the formula $$PbCO_3 + H_2SO_4 \rightarrow PbSO_4 + CO_2 + H_2O \qquad (1)$$

The amount of $PbCO_3$ needed in tank 14 is equal to the amount of total dissolved solids (t.d.s.) in the effluent water. For example, if the rough filtered rinse water from tank 13 contains 15,000 p.p.m. t.d.s., then 15,000 p.p.m. or 15 grams/liter of $PbCO_3$ is needed to effect the reaction. Although a 1:1 ratio is sufficient, any increase in the amount of $PbCO_3$ over this ratio proportionately increases the rate of the reaction.

In a typical case, wherein the rough filtered rinse water contains 15,000 p.p.m. t.d.s., 25 p.p.m. lead, and a pH of approximately 2.3, after only 10 minutes, the pH has risen above 6, the total dissolved solids is approximately 1,200 p.p.m., and the quantity of lead has been reduced to 3 p.p.m. While an additional 30 minutes is required to reach a pH of 7 and a concentration of total dissolved solids of 1,000 p.p.m. or less, the water is of sufficient quality after 10 minutes that it may be reused in the manufacturing process. Thus, after approximately 10 minutes, when the pH has risen above 6 as indicated by a pH probe, not shown, positioned within tank 14, a valve 20 at the outlet of tank 14 is opened and the solution is conducted to a filter 21.

Filter 21 can be a rotary drum filter, a centrifuge, or any other conventional type of filter for recovering the solids from a solution, thereby separating the water from the lead sulfate. The filtered water containing 1,000 p.p.m. t.d.s. or less and 3 p.p.m. lead or less is conducted via a conduit 22 to a polish or precoat filter 23 for further removal of fine particles. The output of filter 23, in a conduit 24, is then conducted back to the manufacturing process for reuse.

Although it requires 40 minutes to obtain a pH 7 in tank 14, the reaction shown above in equation (1) continues after the agitation is stopped and all throughout the filtration cycle in filter 21 or as long as there is any $PbCO_3$ and/or $H_2SO_4$ available to effect a reaction. Therefore, the solution need remain in tank 14 for only approximately 10 minutes before beginning filtration to obtain a satisfactory water for recirculation as process water.

The carbon dioxide, in the form of a gas, from tank 14, is conducted via a conduit 25 to a holding tank or collector 26 for reasons which will be explained more fully hereinafter. The lead sulfate from filter 21, in the form of a wet cake, is next added to a solution of ammonia, $NH_3$, ammonium sulfate, $(NH_4)_2SO_4$, and carbon dioxide, $CO_2$, in a second reaction vessel 27. Vessel 27 is identical to tank 14 and includes an agitating blade 28 connected by a shaft 29 to a drive motor 30. Tank 27 is first filled with the $(NH_4)_2SO_4$, $CO_2$ and $NH_3$ solution from a holding tank 32 as will be explained more fully hereinafter. In any event, lead sulfate is readily soluble in ammonium sulfate, but in the presence of $CO_2$, the lead immediately reacts, forming the insoluble carbonate $PbCO_3$. The reaction is represented by the formula

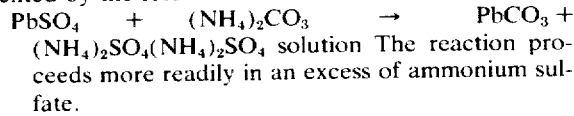

$(NH_4)_2SO_4(NH_4)_2SO_4$ solution The reaction proceeds more readily in an excess of ammonium sulfate.

A slurry containing approximately 15 grams $PbSO_4$ per liter $(NH_4)_2SO_4$, $NH_3 + CO_2$ solution will result in a reaction time of approximately 10 to 15 minutes. The $(NH_4)2 2SO_4$, $NH_3$ and $CO_3$ solution may contain 15-100 grams $(NH_4)_2SO_4$, a minimum of 2 grams $CO_2$ and sufficient $NH_3$ to obtain an alkyline pH. Thus, tank 27 may be processing the output of filter 21 while a second batch of effluent water is being processed in tank 14. After approximately 10 minutes, a valve 33 at the outlet of tank 27 is opened and the solution is conducted to a filter 34, which may be identical to filter 21, for recovering the solids from a solution. Thus, filter 34 separates the liquid ammonium sulfate solution from the lead carbonate precipitate, conducting the ammonium sulfate solution via a conduit 35 to holding tank 32.

The lead carbonate precipitate in filter 34, in the form of a wet cake, is conducted to a dryer 36. The reason for dryer 36 is that the filter cake traps ammonia, thereby contaminating the lead carbonate. In dryer 36, the cake is heated to approximately 212° F, thereby driving off the ammonia which is conducted via a conduit 37 to collector 26, for reasons which will appear more fully hereinafter. The dried, powdered lead carbonate from dryer 36 is conducted via a conduit 38 back to bin 18 for reuse in tank 14.

If the amount of lead carbonate recovered iin dryer 36 equals the amount of lead carbonate needed in tank 14, the lead carbonate is simply recirculated, forming a minor closed loop system within the total system of the present process for effluent water recovery. As a practical matter, there may be an excess or an insufficient amount of lead carbonate recovered in dryer 36. If there is an insufficient quantity of $PbCO_3$ recovered, and additional quantity is conducted into bin 18 from an outside source via conduit 40. Any excess $PbCO_3$ may be removed via a conduit 41 for marketing.

It can be seen that the sulfate molecules which are stripped from the sulfuric acid in tank 14 and combined with lead to form lead sulfate and then again stripped in tank 27, accumulate in holding tank 32 in the form of ammonium sulfate. The alkaline pH of the solution in tank 32 is maintained with additional quantities of ammonia and carbon dioxide derived form holding tanks 42 and 43, respectively. Furthermore, the ammonia on line 37 from dryer 36 and the carbon dioxide on line 25 from tank 14 may also be conducted via collector 26 and a conduit 44 back to tank 32 to control the pH of the solution contained therein.

If left undisturbed, the solution in tank 32 will become so saturated with ammonium sulfate that crystals would start to precipitate out, such crystals clogging the lines, etc. Thus, excess $(NH_4)_2SO_4$ accumulating in tank 32 is continuously bled via a conduit 46 to a crystallizer 47 where $(NH_4)_2SO_4$ crystals are constantly generated. Such crystals may be removed, at 48, and marketed since being in a commercially usable form. The remaining weak solution may be conducted via a conduit 49 to collector or holding tank 26 for return via conduit 44 to holding tank 32.

It can therefore be seen that in accordance with the present invention, there is provided a process for effluent water recovery which completely eliminates the necessity for disposing of the contaminated effluent water appearing in conduit 10. Rather, the large quantities of water used for battery manufacturing, contaminated with lead and sulfuric acid, is processed for recirculation, thus converting the manufacturing process to what virtually amounts to a closed loop system. The by-products of the process are ammonium sulfate crystals and lead carbonate, both of which have certain economic value. By the application of this process, literally thousands of tons of polluted water per day are kept out of the environment and all its contaminants converted to reusable products.

The drying of the filter cake from filter 34 in dryer 36 to liberate the ammonia trapped therein is critically important to the present process. If this were not done, ammonia would be added with the lead carbonate to tank 14 thereby forming ammonium sulfate in conduit 22. Such ammonium sulfate would render the water unsuitable for reuse in the manufacturing process.

The reaction times in tanks 14 and 27 are sufficiently compatible that both reactions may take place simultaneously. Thus, tanks 14 and 27 may be drained simultaneously, the liquid from filter 34 being conducted to holding tank 32 and the liquid from filter 21 being conducted via polish filter 23 back to the manufacturing process. As soon as tanks 14 and 27 have been completely drained, valves 20 and 33 are closed and tanks 14 and 27 are refilled, tank 14 being filled with effluent water over conduit 50 from tank 13 and tank 27 being filled with ammonium sulfate, ammonia and carbon dioxide solution over conduit 51 from tank 32. As soon as tanks 14 and 27 are filled, a measured quantity of $PbCO_3$ from bin 18 may be dumped into tank 14 and the lead sulfate from filter 21 may be dumped into tank 27. At this time, the filter cake from filter 34 may be dumped into dryer 36 permitting tanks 14 and 27 and dryer 36 to operate simultaneously. Other methods of implementing the present process will be apparent to those skilled in the art.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment but only by the scope of the appended claims.

I claim:

1. A process for converting effluent water, contaminated with lead and sulfuric acid as a result of a manufacturing process, into water suitable for reuse comprising the steps of:
   adding lead carbonate to the effluent water in a first agitated enclosure in an amount approximately equal to or greater than the amount of total dissolved solids in said effluent water to form water, carbon dioxide, and insoluble lead sulfate;
   filtering the contents of said first enclosure to separate the water from the lead sulfate;
   conducting the filtered water back to the manufacturing process for reuse;
   adding the filtered lead sulfate to a solution of ammonium sulfate, ammonia, carbon dioxide, and water in a second agitated enclosure in an amount sufficient to form ammonium sulfate and insoluble lead carbonate;
   filtering the contents of said second enclosure to separate the ammonium sulfate solution from the lead carbonate;
   conducting the filtered ammonium sulfate solution to a holding tank for reuse in said second enclosure; and
   drying the filtered lead carbonate to remove residual ammonia therefrom.

2. A process according to claim 1 further comprising the step of:
   conducting the dried lead carbonate powder back to said first enclosure.

3. A process according to claim 1 further comprising the step of:
   conducting the liberated ammonia which results from the drying step to said ammonium sulfate holding tank.

4. A process according to claim 1 further comprising the step of:
   conducting excess ammonium sulfate from said holding tank to a crystallizer for generation of ammonium sulfate crystals.

5. A process according to claim 1 wherein said step of filtering the contents of said first enclosure commences in less than 40 minutes after said lead carbonate is added to said effluent water in said first enclosure.

6. A process according to claim 1 wherein said steps of filtering the contents of said first and second enclosures occur approximately 10 to 15 minutes after said steps of adding lead carbonate to said effluent water in said first enclosure and adding said filtered lead sulfate to said second enclosure, respectively.

7. A process according to claim 1 further comprising the step of:
   conducting the carbon dioxide from said first enclosure to said ammonium sulfate holding tank.

8. A process according to claim 1 wherein at least a liter of ammonium sulfate and carbon dioxide solution is added to said second enclosure for every 15 grams of said filtered lead sulfate.

9. A process according to claim 2 further comprising the step of:
   conducting the liberated ammonia which results from the drying step to said ammonium sulfate holding tank.

10. A process according to claim 8 wherein said steps of filtering the contents of said first and second enclosures occur approximately 10 to 15 minutes after said steps of adding lead carbonate to said effluent water in said first enclosure and adding said filtered lead sulfate to said second enclosure, respectively.

11. A process for converting effluent water, contaminated with lead and sulfuric acid as a result of a manufacturing process, into water suitable for reuse comprising the steps of:
   accumulating the effluent water in a first holding tank;
   periodically filling a first agitated enclosure with the effluent water from said first holding tank;
   adding lead carbonate to said first enclosure in an amount which is approximately equal to or greater than the amount of total dissolved solids in said effluent water to form water, carbon dioxide, and insoluble lead sulfate;
   filtering the contents of said first enclosure to separate the water from the lead sulfate;
   conducting the filtered water back to the manufacturing process for reuse;
   accumulating a solution of ammonium sulfate, ammonia, carbon dioxide, and water in a second holding tank;
   periodically filling a second agitated enclosure with the ammonium sulfate, ammonia, and carbon dioxide solution from said second holding tank;

adding the filtered lead sulfate to said second enclosure thereby forming ammonium sulfate and insoluble lead carbonate;

filtering the contents of said second enclosure to separate the ammonium sulfate solution from the lead carbonate;

conducting the filtered ammonium sulfate solution back to said second holding tank for reuse;

drying the filtered lead carbonate to remove residual ammonia therefrom;

conducting the dried lead carbonate back to said first enclosure;

conducting the carbon dioxide formed in said first enclosure to said second holding tank;

conducting the liberated ammonia, which results from the step of drying the filtered lead carbonate, to said second holding tank; and conducting excess ammonium sulfate solution from said second holding tank to a crystallizer for generation of ammonium sulfate crystals.

12. A process according to claim 11 wherein at least a liter of ammonium sulfate and carbon dioxide solution is added to said second enclosure for every 15 grams of said filtered lead sulfate.

13. A process according to claim 11 wherein said steps of periodically filling said first and second enclosures occur substantially simultaneously whereby said first enclosure is forming lead sulfate from one batch of effluent water while said second enclosure is forming lead carbonate from the lead sulfate formed from a previous batch of effluent water.

14. A process according to claim 13 wherein said steps of filtering the contents of said first and second enclosures occur substantially simultaneously.

15. A process according to claim 14 wherein the steps of filtering the contents of said first and second enclosures occur approximately ten to fifteen minutes after the steps of adding lead carbonate to said first enclosure and adding the filtered lead sulfate to said second enclosure, respectively.

* * * * *